(12) United States Patent
Hosoe (10) Patent No.: US 7,388,308 B2
(45) Date of Patent: Jun. 17, 2008

(54) SPINDLE DEVICE

(75) Inventor: Shigeru Hosoe, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 151 days.

(21) Appl. No.: 11/356,081

(22) Filed: Feb. 17, 2006

(65) Prior Publication Data

US 2006/0186750 A1 Aug. 24, 2006

(30) Foreign Application Priority Data

Feb. 22, 2005 (JP) ............................. 2005-046002

(51) Int. Cl.
*H02K 21/12* (2006.01)
(52) U.S. Cl. .................. 310/156.36; 310/112
(58) Field of Classification Search ................ 310/112, 310/156.36, 156.47, 54, 90
See application file for complete search history.

(56) References Cited

U.S. PATENT DOCUMENTS

| | | | |
|---|---|---|---|
| 5,182,483 A * | 1/1993 | Hibino et al. ............... 310/211 |
| 5,274,286 A * | 12/1993 | Yamamura ................. 310/67 R |
| 5,818,141 A * | 10/1998 | Cho et al. ................... 310/211 |
| 5,869,941 A * | 2/1999 | Shiozaki et al. ............ 318/481 |
| 6,307,284 B1 * | 10/2001 | Mitarai et al. ................. 310/12 |
| 6,727,624 B2 * | 4/2004 | Morita et al. ........... 310/156.78 |
| 2003/0202166 A1 * | 10/2003 | Takeishi ....................... 355/72 |
| 2006/0055266 A1 * | 3/2006 | Iwami et al. ........... 310/156.47 |
| 2006/0163969 A1 * | 7/2006 | Nemoto et al. ............. 310/261 |
| 2007/0205689 A1 * | 9/2007 | Nemoto et al. ........ 310/156.47 |

FOREIGN PATENT DOCUMENTS

JP 06225509 A * 8/1994

* cited by examiner

*Primary Examiner*—Darren Schuberg
*Assistant Examiner*—Hong-Vinh Nguyen
(74) *Attorney, Agent, or Firm*—Finnegan, Henderson, Farabow, Garrett & Dunner, L.L.P.

(57) ABSTRACT

A built-in motor type spindle device comprising a housing and a spindle, wherein said spindle device further includes static pressure bearings which support the spindle so that the spindle can rotate freely relatively to the housing, two lines of magnetic field generating members which are provided on the spindle, and two pairs of coils which are provided on the housing and respectively face the magnetic field generating members and since the spindle device circumferentially disperses the which magnetic field generating members generate heat, the spindle device can prevent the spindle from being hot locally and further, since the surface area of the magnetic field generating members on the spindle are made larger, they can be cooled more effectively than one line of magnetic field generating members.

1 Claim, 5 Drawing Sheets

SPINDLE DEVICE

This application is based on Japanese Patent Application No. 2005-046002 filed on Feb. 22, 2005 in Japanese Patent Office, the entire content of which is hereby incorporated by reference.

BACKGROUND OF THE INVENTION

This invention relates to a preferred spindle device and particularly to a built-in motor type spindle device preferably used by a high-precision machine tool.

Conventionally, a general spindle device has its spindle supported to rotate by rolling bearings (such as ball bearings or roller bearings) or static pressure bearings which use static pressure of a working fluid such as oil or air.

The spindle device using rolling bearings causes no problem at lower speeds since balls or rollers rotate between inner and outer wheels, but causes problems of a spindle runout and heat generation at higher speeds since it causes vibration and frictional heat. To prevent this, it is necessary to lubricate the running wheel surfaces. This is time-consuming for maintenance and increases the running cost of the equipment.

Meanwhile, since the static pressure bearings support a shaft by a static pressure of a pressure transmission medium, the built-in motor type spindle device (see Patent Document 1) can be expected to have a higher rotational accuracy than the spindle device which uses rolling bearings. Therefore, the static pressure bearings are suitable for finishing machines which processes optical transfer surfaces of optical element molding dies to form optical surfaces of optical elements.

As for a high-precision working machine including the spindle device which uses static pressure bearings, the speed of the spindle is preferably increased to improve the working efficiency. However, when the spindle is rotated fast, shearing of the pressure transmission medium is caused in the static pressure clearances to which the medium is supplied (minute clearances between the static pad and the spindle). This causes generation of heat in the bearings. Further, the shearing resistance of the pressure transmission medium which is generated simultaneously consumes part of the driving force of a motor which drives the spindle. Particularly, after the spindle speed reaches a preset speed in the built-in motor type spindle device which requires very fast rotation, almost all additional power supplied to the motor is consumed as heat without increasing the speed. This heat will locally make the spindle hotter and unignorably deform the spindle. In extreme cases, the spindle will have a break such as galling and seizure. In other words, one of the most important problems to be solved in the spindle which is supported by static pressure bearings to rotate fast is to cool the spindle efficiently.

The static pressure pad and other part of a static pressure bearing can be cooled by providing a pipe and applying cooling water to them. Similarly, the core section of the motor can be cooled by blowing-out of air or circulation of cooling water. For example, a motor of the type disclosed by Patent Document 1 is equipped with a water jacket inside the motor housing with which the motor core is in contact to cool the motor by water which flows through the water jacket. However, this configuration does not assure effective heat radiation due to contact since the spindle supported by the static bearings is not in direct contact with the motor housing. Also in this case, only cooling of the motor housing is not enough to cool the spindle when the spindle becomes very hot due to heat generation of the motor coils and magnets by power supply.

[Patent Document 1] Japanese Patent Publication Tokkaihei 10-19043

SUMMARY OF THE INVENTION

This invention has been made in view of the above problems of the conventional technology and an object is to provide a spindle device which is free from cooling problems and suitable for high-precision fast machining work.

To attain the above object, one embodiment of this invention is a built-in motor type spindle device which comprises a housing, a spindle, static pressure bearings which support the spindle so that the spindle can rotate freely with respect to the housing, two lines of magnetic field generating members disposed on the spindle, and two pairs of coils provided on the housing and facing the magnetic field generating members respectively.

DETAILED DESCRIPTION OF THE PREFERRED EMBODIMENT

The above object of this invention can be attained by the following structures:

(1) A built-in motor type spindle device comprising a housing and a spindle, wherein said spindle device further comprises static pressure bearings which support the spindle so that the spindle can rotate freely with respect to the housing, two lines of magnets which are provided on the circumference of the spindle with their opposite polarity poles positioned alternately, and two pairs of coils which are provided on the housing and respectively facing the magnets.

(2) A built-in motor type spindle device comprising a housing and a spindle, wherein said spindle device further comprises static pressure bearings which support the spindle so that the spindle can rotate freely with respect to the housing, two lines of conductors which are provided on the spindle, and two pairs of coils which are provided on the housing and respectively facing the conductors.

(3) A spindle device of Item (1) or (2), wherein the two lines of magnets are disposed so that the phase arrangements of the opposite polarity magnet poles of the magnets are displaced from each other in the circumferential direction.

(4) A spindle device of any of Items (1) to (3), wherein the two pairs of coils are wound around the two pairs of cores respectively and the phase arrangements of the two pairs of cores are displaced from each other in the circumferential direction.

(5) A spindle device of any of Items (1) to (4), wherein the angles of the skews of the two lines of magnets are reverse to each other.

(6) A spindle device of any of Items (1) to (5), wherein the two pairs of coils are respectively wound around the two pairs of cores and the cores are skewed reversely to each other.

(7) A spindle device of any of Items (1) to (6), wherein the housing is equipped with a cooling jacket to which a cooling medium is supplied from the outside.

(8) A spindle device of Item (7), wherein the spindle is supported to rotate freely with respect to the housing by a pressure transmission medium which is supplied to the clearance between the static pressure bearing and the spindle.

A built-in motor type spindle device of Item (1) comprising a housing and a spindle, wherein said spindle device further comprises static pressure bearings which support the spindle so that the spindle can rotate freely with respect to the housing, two lines of magnets which are provided on the circumference of the spindle with opposite polarity poles positioned alternately, and two pairs of coils which are provided on the housing and respectively facing the magnets.

The spindle device of this invention has two lines of magnets provided on the circumference of the spindle with opposite polarity poles arranged alternately and two pairs of coils provided on the housing and respectively facing the magnets. This spindle device can drive the spindle at the same torque compared with the spindle device which uses one line of magnets and one coil. However, this spindle device can prevent the spindle from being hot locally since the device circumferentially disperses the coils and the magnets which generate heat. Further, since the area of surface of magnets on the spindle are made larger, they can be cooled more effectively than one line of magnets.

A built-in motor type spindle device of Item (2) comprising a housing and a spindle, wherein said spindle device further comprises static pressure bearings which support the spindle so that the spindle can rotate freely with respect to the housing, two lines of conductors which are provided on the spindle, and two pairs of coils which are provided on the housing and respectively facing to the conductors.

The spindle device of this invention has two lines of conductors (i.e., copper or aluminum conductors) provided on the circumference of the spindle and two pairs of coils provided on the housing and respectively facing the conductors. This spindle device can drive the spindle at the same torque compared with the spindle device which uses one line of conductors and one coil. However, this spindle device can prevent the spindle from being hot locally since the device circumferentially disperses the coils and the conductors which will generate heat. Further, since the area of surfaces of the conductors on the spindle is made larger, they can be cooled more effectively than one line of conductors. Usually, an induction motor uses conductors and coils.

A spindle device described in Item (3) is a spindle device of Item (1) or (2), wherein the two lines of magnets are disposed on the circumference of the spindle with the phase arrangement of the opposite polarity poles displaced each other in the circumferential direction.

It is preferable to make the outer diameter of the spindle as small as possible to suppress its moment of inertia and to realize high speed of the spindle. However, if the spindle of the built-in motor type spindle device is made slender, the number of magnets and cores must be limited on the circumference of the spindle. For example, the spindle device whose speed is 10000 $min^{-1}$ or higher, the number of magnets on the circumference of the spindle is generally limited to 4 or 8 poles. If the number of poles is small like this, 4 or 8 torque fluctuations occur per revolution of the spindle. This torque fluctuation will cause the spindle to vibrate and the vibration will cause work pieces and tools which are fixed to the spindle to be displaced in synchronization with rotational angles. Consequently the machined surfaces will have unwanted undulations. This reduces the surface accuracy. To avoid this, the spindle must be thicker and have more poles. However, thereby the thick spindle with more poles will increase the moment of inertia and it causes the reasons why the speed of the spindle cannot be increased.

This invention disposes the two lines of magnets on the circumference of the spindle with the phase arrangement of the opposite polarity magnet poles of the magnets are shifted from each other in the circumferential direction. For example, the torque fluctuations of this spindle with four magnet poles can be substantially suppressed down to those of the spindle with eight magnet poles. This enables thin spindles to rotate faster. Further, this can greatly suppress torque unevenness and increase the accuracies of rotation and machining work. In this case, the phases of two lines of magnets should preferably be shifted by ½ pitch from each other to suppress torque unevenness effectively.

The spindle device described in Item (4), wherein the two pairs of coils are wound around the cores and the phases of two pair of the cores are shifted from each other in the circumferential direction according to any one of Items (1) to (3). As described above, this spindle device also enables thin spindles to rotate faster. Further, this can greatly suppress torque unevenness and increase the accuracies of rotation and machining work. In this case, the phases of two lines of cores should preferably be shifted by ½ pitch from each other to suppress torque unevenness effectively.

The spindle device described in Item (5), wherein the two lines of magnets are skewed reversely from each other according to any one of Items (1) to (4).

A technology to skew magnets has been known to suppress torque unevenness of a spindle with less magnet poles. Skewing is to place coil cores and magnets at a certain angle with respect to the rotational axis. Generally, this skew angle is about 5 to 15 degrees. This skew angle has an effect to smooth torque actions by partially changing one magnet pole with respect to a core (continuously from one end to the other) instead of changing magnetic fields when the magnetic pole intermittently traverses across the core of the coil on the stator or the magnet on the rotor during rotation. However, when one line of magnets are skewed to one direction, a thrust component force is generated on the spindle and a displacement along the axis direction may occur. To avoid this, the thrust component force is reduced by widening the clearance between the core and the magnet to make the magnetic field wider. However, this method weakens the driving force of the motor and makes it difficult to rotate the spindle faster. Further, it is possible to increase the area of the static pressure bearing which receives the thrust force and increase the rigidity, but this increases the moment of inertia and consequently makes it difficult to rotate the spindle faster.

The device of this invention skews the two lines of magnets reversely to each other to balance the thrust component forces on the spindle. This enables thin spindles to rotate faster. Further, this can greatly suppress torque unevenness and increase the accuracies of the rotation and the machining work. In this case, it is preferable that the two lines of magnets are respectively skewed at angles whose absolute values are equal and which have positive-negative opposite relationship, with the angle parallel to the axis line as 0 degree.

The spindle device described in Item (6) is a spindle device of any one of Items (1) to (4), wherein the two pairs of coils are respectively wound around the cores and the two pairs of cores are skewed reversely to each other. As described above, this can also balance the thrust component forces on the spindle. This enables thin spindles to rotate faster. Further, this can greatly suppress torque unevenness and increase the accuracies of the rotation and the machining work. In this case, it is preferable that the two pairs of cores are respectively skewed at angles whose absolute values are equal and which have positive-negative opposite relationship, with the angle parallel to the axis line as 0 degree.

The spindle device described in Item (7) is a spindle device of any one of Items (1) to (6), wherein the housing is equipped with a cooling jacket to which a cooling medium is supplied from the outside. This can increase the effect of cooling the spindle. Usually, cooling water is available as the cooling medium. However, the cooling medium is not limited to this and any cooling medium such as liquid and air can be used.

The spindle device described in Item (8) is a spindle of Item (7), wherein the spindle is supported to rotate freely relatively to the housing by a pressure transmission medium which is supplied to the clearance between the static pressure bearing and the spindle.

This invention can provide a spindle device which is free from cooling problems and suitable for high-precision fast machining work.

Figure 1:
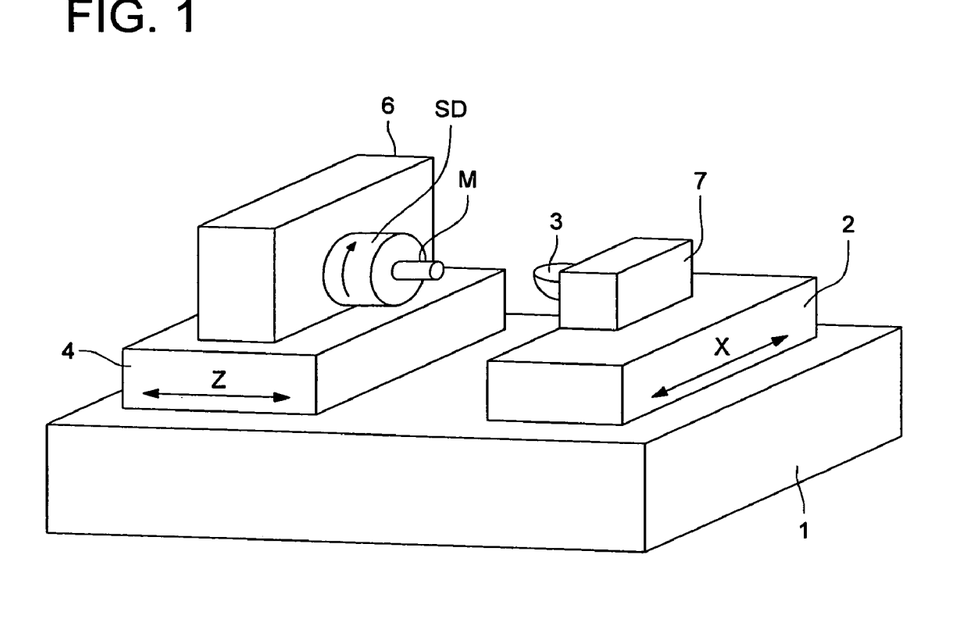
FIG. 1 is a perspective view of a precision 2-axis turning machine.

The following is a description of the preferred embodiments of this invention with reference to the drawings. The built-in motor type spindle device of the embodiments of this invention can be used for the biaxial high-precision turning machine. In FIG. 1, the X-axis table 2 which is driven in the X-axis direction by a control device which is not shown is disposed on the surface plate 1. A diamond tool 3 is mounted on the X-axis table 2 via the tool mounting section 7. In addition, the Z-axis table 4 which is driven in the Z-axis direction by a control device which is not shown is disposed on the surface plate 1. The Z-axis table 4 has a drive control mechanism 6 and a spindle device SD that is controlled by the drive control mechanism 6. The work piece M which is a molding die for an optical element for example, may be mounted on the main shaft of the spindle device SD. The biaxial high-precision turning machine may be used for accurately cutting the transfer optical surface of the molding die for the optical element.

Figure 2:
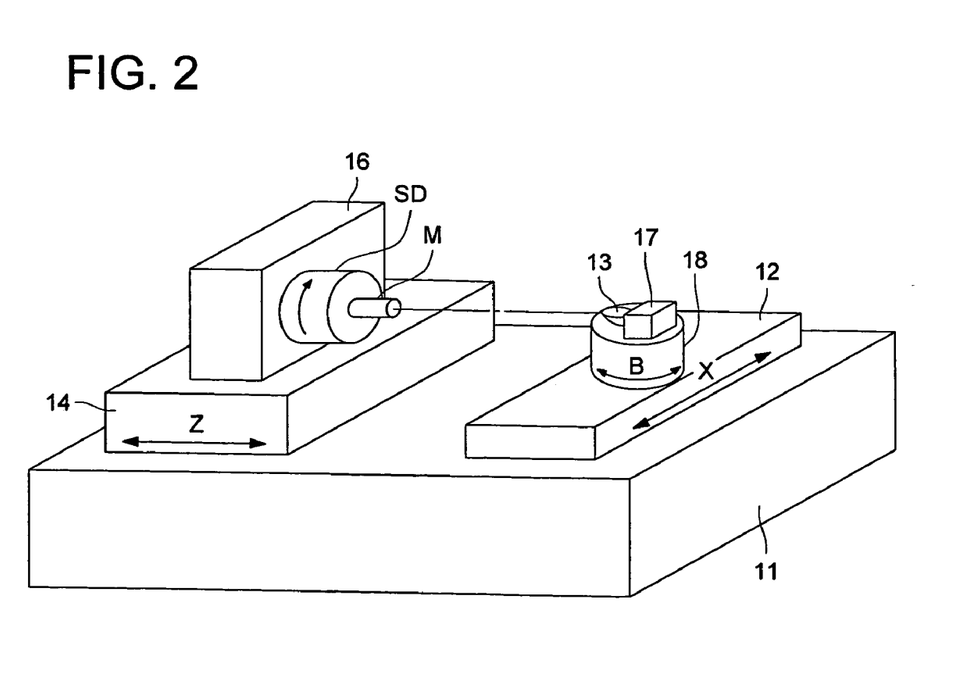
FIG. 2 is a perspective view of a precision turning machine.

In addition, a built-in motor type spindle device of the embodiment of this invention may be used in the high-precision turning machine shown in FIG. 2. In FIG. 2, the X-axis table 12 which is driven in the X-axis direction and the Z-axis table 14 which is driven in the Z-axis direction are mounted on the surface plate 11. A revolving shaft (shaft B) 18 which can revolve the tool 13 is mounted on the X-axis table 12, and a tool mounting portion 17 is mounted on the revolving shaft 18. The Z-axis table 14 has a drive control mechanism 16 and a spindle device SD that is controlled by the drive control mechanism 16. The work piece M which is a molding die for an optical element for example, may be mounted on the main shaft of the spindle device SD. The high-precision turning machine may be used for accurately cutting the transfer optical surface of the molding die for the optical element.

Figure 3:
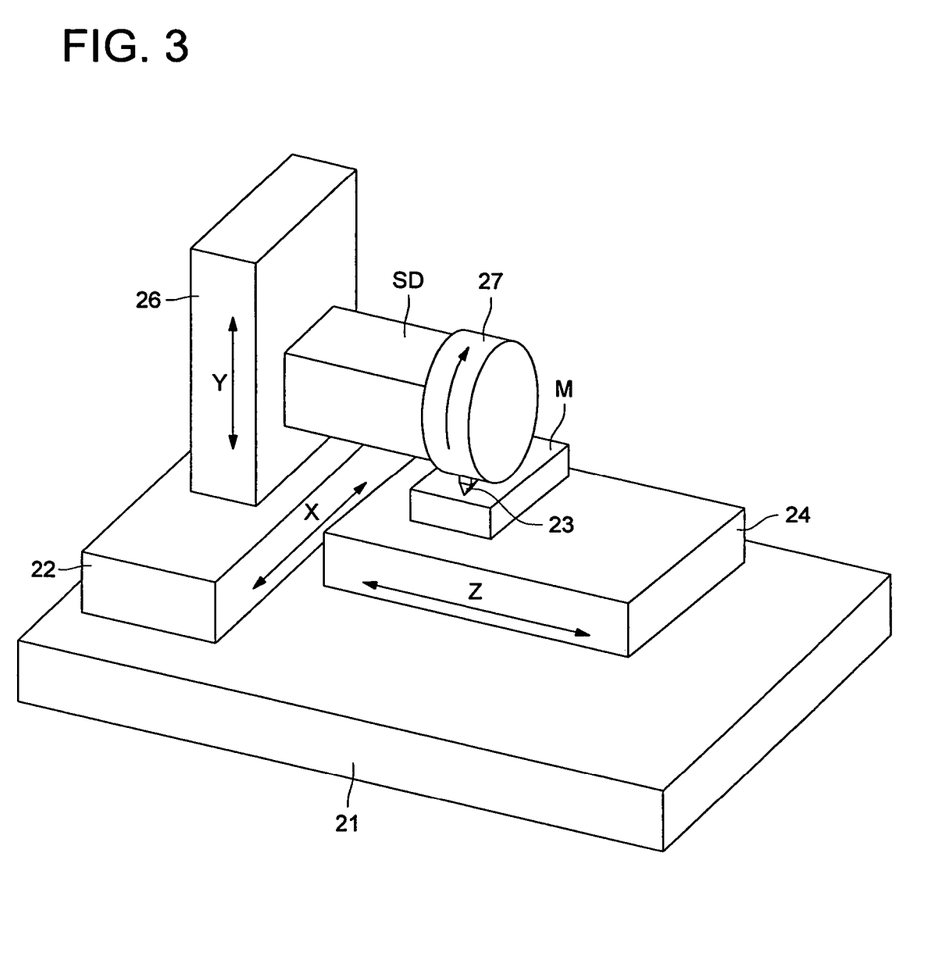
FIG. 3 is a perspective view of a super-precision machining tool which comprises an orthogonal 3-axis movable stage and a rotating mechanism which rotates a diamond tool.

Furthermore, the built-in motor type spindle device of the embodiment of this invention may be used in the ultra high-precision machining tool shown in FIG. 3 which has an orthogonal triaxial movable stage and a rotation device which rotates the diamond tool. In FIG. 3, the X-axis table 22 which is driven in the X-axis direction and the Z-axis table 24 which is driven in the Z-axis direction are mounted on the surface plate 21. A Y-axis stage 26 which is driven in the Y-axis direction is mounted on the X-axis table 22 and a spindle mechanism SD is disposed on the Y-axis stage 26, and the main shaft thereof is connected to the rotation portion 27 for rotating the diamond tool 23. The rotating axis thereof is parallel to the Z axis. The work piece M is fixed on the Z-axis table 24.

Figure 4:
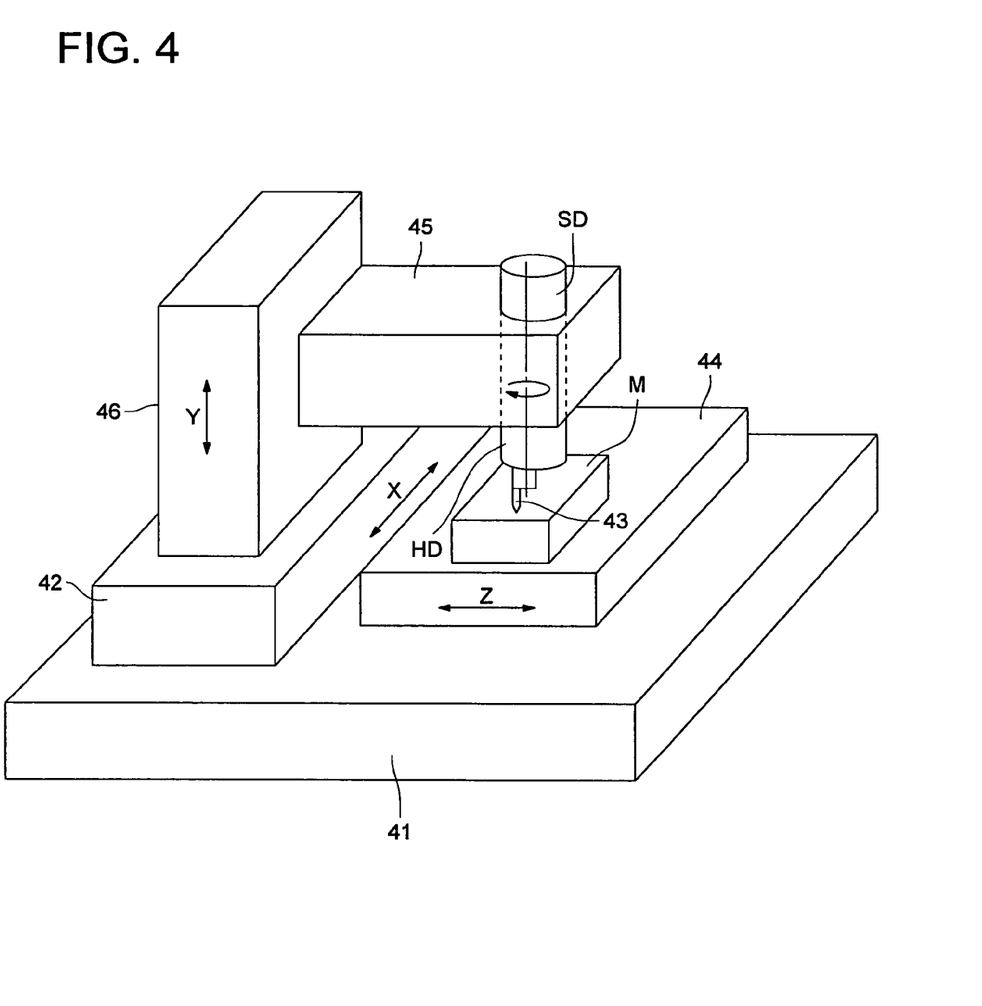
FIG. 4 is a perspective view of a milling machine.

Furthermore, the built-in motor type spindle device of the embodiment of this invention may be used in the milling machine shown in FIG. 4. In FIG. 4, the X-axis stage 42 which is driven in the X-axis direction and the Z-axis stage 44 which is driven in the Z-axis direction are mounted on the surface plate 41. The Y-axis stage 46 which is driven in the Y-axis direction is mounted on the X-axis table 42, and the spindle device SD which rotates the diamond tool 43 is supported by the arm 45 on the Y-axis stage 46. Mounting the tool on the end surface of the main shaft of spindle SD which is installed in the arm 45 so that the blade tip of the tool locates, for instance, at the position 15 mm away from the rotation center in radial direction. With giving the cutting depth in the Y-axis direction and feeding the diamond tool 43 in the X-axis direction with respect to the work piece M fixed on Z-axis stage 44, cutting work is carried out.

Figure 5:
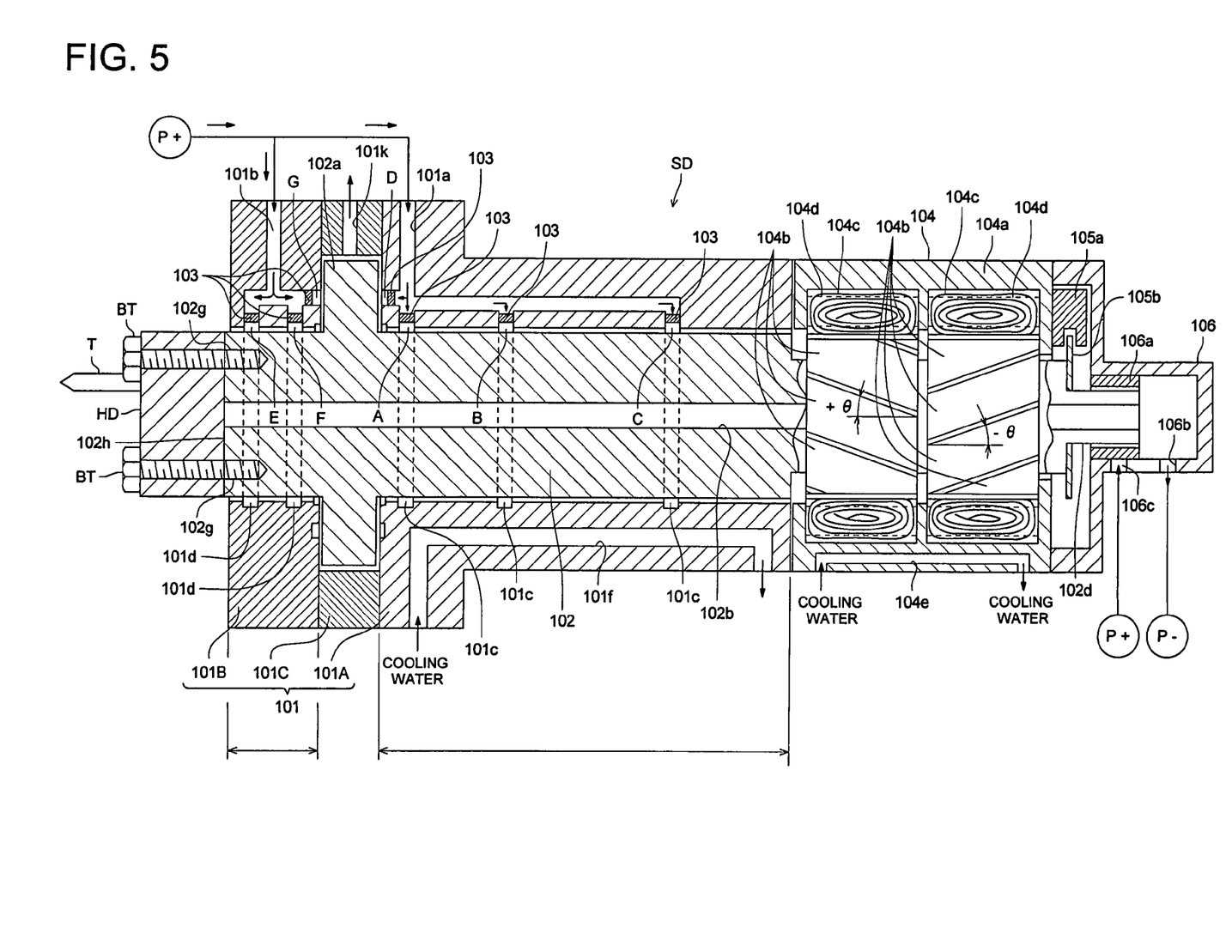
FIG. 5 is a sectional view of a spindle device of a preferred embodiment of this invention.

FIG. 5 is a cross-section view of the built-in motor type spindle device of this embodiment. The spindle device SD of FIG. 5 can be installed in the milling machine of FIG. 4 for example, however not limited thereto. Needless to say it may be installed in processing machines such as those in FIGS. 1 to 3 as well as in others.

In FIG. 5, a cylindrical main shaft 102 is inserted inside the hollow cylindrical housing 101. The space between both is about 10 µm. The main shaft 102 has a flange 102a at the left end vicinity in FIG. 5 and also has a through-hole 102b at the center. The housing 101 has a main housing 101A which is disposed at the right side of the flange 102a, a secondary housing 101B which is disposed at the left side of the flange 102a and a ring block 101C which connects the main housing 101A and the secondary housing 101B in the radial outer direction of the flange 102a.

The main housing 101A has a supply path 101a whose one end opens at the external peripheral surface and which is communicated with the positive pressure pump P+ which is an external source of fluid. The other end of the supply path 101a opposes and opens onto the outer peripheral surface of the main shaft 102 in three rows which are aligned in the axial direction and are at 120 degree intervals in the peripheral direction (these are called the discharge ports A, B and C) on the inner peripheral surface of the main housing 101A and also opposes the flange 102a at the end surface of the main housing 101A and opens at a 120 degree interval in the peripheral direction (this is called the discharge port D). An aperture member 103 having a small hole (defining the minimum cross sectional area of the supply path) is fitted at each of the discharge ports of the supply paths 101a. A peripheral groove 101c is formed at the inner peripheral surface at the main housing 101A so as to connect the discharge ports A, B and C of the supply paths 101a. In the present embodiment, the entire inner circumferential surface of the main housing 101A is subjected to static pressure and it functions as a radial static pressure bearing. It is to be noted that the housing 101A has a cooling jacket 101f in which cooling water flows, but these are not connected to the supply path 101a.

The secondary housing 101B has a supply path 101b whose one end opens at the external peripheral surface and which is connected to the positive pressure pump P+ which is an external source of fluid. The other end of the supply path 101b opposes and opens to the outer peripheral surface of the main shaft 102 in two rows which are aligned in the axial direction and are provided radially at 120 degree intervals in the peripheral direction (these are called the discharge ports E and F) on the inner peripheral surface of the secondary housing 101B. It also opposes the flange 102a at the end-surface of the secondary housing 101B and opens at a 120 degrees interval in the peripheral direction (this is called the discharge port G). An aperture member 103 having a small hole is fitted at each of the discharge ports of the supply paths 101b. A peripheral groove 101d is formed at the inner peripheral surface of the secondary housing 101B so as to communicate with the discharge ports E and F of the supply path 101b. In the present embodiment, the entire inner circumferential surface of the secondary housing 101B is subjected to static pressure and it functions as a radial static pressure bearing.

The ring housing 101C has an air vent 101k which discharges air from the space between the inner periphery and the flange 102a of the main shaft 102 to the outer periphery.

The motor 104 which is the driving device is adjacent to the main housing 101A. The motor 104 is composed of the motor case 104a forming a part of the housing, the magnets 104b, 104b of 4 pole 2 rows (lined in the axis direction) which are mounted on the main shaft 102 so that opposite polarity poles are arranged alternately (such as N pole, S pole, N pole, S pole), the two pairs of coils 104c, 104c which are disposed inside the motor case 104a which is at the outside in the radial direction of the magnets 104b, 104b, and cores 104d, 104d which are wound around coils 104c, 104c. The main shaft 102 is rotated and driven as a known manner by supplying power to the coil 104c, 104c from the outside. This motor case is provided with a hole 104e and cooling water passing here restrains a temperature rise of motor case 104a caused from heat generation of coils 104c, 104c.

In FIG. 5, magnet 104b in the left line is skewed at +θ degrees to the axis line and magnet 104b in the right line is skewed at −θ degrees to the axis line. The phase arrangement of the two lines of magnets 104b and 104b are shifted by ½ pitch from each other on the circumference of the spindle.

A reduced diameter cylindrical portion 102d is formed coaxially with the main shaft 102 at the right end of the main shaft. The reduced diameter cylindrical portion 102d has an encoder plate 105b that rotates, integrally mounted at the outer periphery thereof. The encoder 105a detects the angle of rotation of the encoder plate 105b and determines the angle of rotation of the main shaft 102.

The front end of the reduced diameter cylindrical portion 102d is inserted into the suction case 106. The suction case 106 is mounted to the housing 101 and the opening end thereof has a static pressure pad 106a formed as a porous circular pipe which opposes the outer peripheral surface of the reduced diameter cylindrical portion 102d. A supply path 106c which is provided at the suction case 106 and at the back surface side of the static pressure pad 106a is connected to the positive pressure pump P+ and pressurized air is supplied from the pump to the area between the outer peripheral surface of the reduced diameter cylindrical portion 102d and the inner peripheral surface of the static pressure pad 106a via the path. Thereby, contact between the suction case 106 and the reduced diameter cylindrical portion 102d is avoided. The space inside the suction case 106 communicates with the through-hole 102b of the main shaft 102 and the discharge port 106b and the air in the through-hole 102b are suctioned by the negative pressure pump P− which is connected to the discharge port 106b.

The left end of the main shaft 102 is a flat surface and because the bolt-hole 102g is formed therein, it is used to mount the holder HD which holds the tool T. When the negative pressure pump P− is driven, while the mounting surface for the holder HD is pressed onto the main shaft 102, the air inside the through-hole 102b is suctioned via the suction case 106 causing negative pressure and thus the holder HD is fixed to the main shaft 102 due to the pressure difference compared to atmospheric pressure. In this step, centering of the holder HD is performed while rotating the main shaft 102. After centering of the holder HD is appropriately carried out, the holder HD is fixed to the main shaft 102 by screwing a bolt BT into the bolt-hole 102g. Once the holder HD is fixed to the main shaft 102 using the bolt BT, even if the main shaft 102 is rotated and driven at the high speed of 10,000 min$^{-1}$ or more, dropping or shifting due to the centrifugal force does not occur.

When the spindle device SD of FIG. 5 is operated when integrated into the milling machine of FIG. 4, because the main shaft 102 is supported in a non-contact state with respect to the main housing 101A and the secondary housing 101B due to the air supplied from the positive pressure pump P+ to the inside of the main housing 101A and the secondary housing 101B via the discharge ports A, B, C, E and F of the supply path 101a and 101b, the load from the tool T in the radial direction can be received.

In addition, because the flange 102a of the main shaft 102 is supported in a non-contact state with respect to the main housing 101A and the secondary housing 101B due to the air supplied from the positive pressure pump P+ to the inside of the main housing 101A and the secondary housing 101B via the discharge ports D and G of the supply path 101a and 101b, the load from the tool T in the thrust direction can be received. That is, both surfaces of the flange 102a and the end surfaces of the main housing 101A and the secondary housing 101B opposed by the flange constitute the static pressure bearing for the thrust force.

When motor 104 is driven in this state, main shaft 102 rotates. In accordance with the preferred embodiment, motor casing 104a contains two pairs of coils 104c and 104c which are respectively opposite to two lines of magnets 104b and 104b. This spindle device can prevent main shaft 102 from being hot locally since the device circumferentially disperses the magnets 104b and 104b which generate heat, even though this spindle device generally can drive the main shaft 102 at the same torque compared with the spindle device which uses one line of magnets and one coil. Further, since the area of two lines of magnets 104b and 104b on main shaft 102 are made larger, in spite of heat generation of magnets 104b and 104b they can be cooled more effectively than one line of magnets. Additionally, the temperature rise of motor casing 104a due to heat generation of coils 104c, 104c can be suppressed by cold water supplied through hole 104e of motor casing 104a.

Particularly, two Lines of magnets 104b and 104b are disposed on the circumference with the phase arrangement of the two lines of opposite polarity poles shifted from each other in the circumferential direction. Therefore, the torque fluctuations of this main shaft 102 with four magnet poles can be substantially suppressed down to those of the main shaft with eight magnet poles. This enables the main shaft 102 to be thin to rotate faster. Further, this can greatly suppress torque unevenness and increase the accuracies of the rotation and the machining work. Further, two lines of magnets 104b and 104b are skewed in opposite directions to each other (+θ degrees and −θ degrees). This can suppress the thrust component forces on the main shaft 102 and enables main shaft 102 to be thin to rotate faster. Further, this can greatly suppress torque unevenness and increase the accuracies of the rotation and the machining work.

Further, when heated by heat transmission from motor 104 during rotation, main shaft 102 is cooled by cold water supplied to cooling jacket 101f and the thermal expansion of the spindle is suppressed. Even when main shaft 102 is eccentric to reduced diameter cylindrical part 102d, the clearance between reduced diameter cylindrical part 102d and suction casing 106 is assured by the static pressure of air jetted out from static pressure pad 106a and keeps the spindle from touching reduced diameter cylindrical part 102d.

At this time, the discharge port of the supply path 101a at the main housing 101A is connected to the peripheral groove 101c, and the discharge port of the supply path 101b at the secondary housing 101B is connected to the peripheral groove 101d, and thus even in the case where the cross-section of the main housing 101A, the secondary housing 101B or the main shaft 102 is not perfectly circle, the peripheral grooves 101c and 101d form a temporary accumulation region in which the air supplied from the supply paths 101a and 101b has a substantially uniform pressure along the entire circumference, and regardless of the positional relationship between the static pressure space due to rotation and the discharge port, and the fluctuations in pressure applied to the outer peripheral surface of the main shaft 102 is controlled, and vibration thereof is also controlled.

It is to be noted that the air supplied from the supply path 101a passes between the main shaft 102 and the main housing 101A and flows out from the space formed with the motor 104 to the outside. In addition, air supplied from the supply path 101b passes between the main shaft 102 and the secondary housing 101B and flows out from the vicinity of the holder HD to the outside. Thus because there is no discharge path between the discharge ports A, B and C of the supply path 101a which open to the inner periphery and are aligned in the axial direction and the discharge ports E and F of the supply path 101b, the fluid that is supplied only passes between the outer peripheral surface of the main shaft 102 and the inner peripheral surfaces of the housings 101A and 101B and flows to the outside and the static pressure is thereby increased and the support rigidity is increased. If the high temperature limit from heat generation is the same, according to the invention, since a rotor shaft with a larger diameter and a larger static pressure area than before can be used, thereby rigidity and rotational accuracy can be improved.

As a comparative example, a spindle device of 40 mm in the outer diameter of the main shaft and 85 mm in the outer diameter of the flange was driven at 35,000 min$^{-1}$ by a servo motor with a single core while supplying water of room temperature (22 degrees centigrade) to the housing and the motor casing. In this experiment, the temperature of the cooling water went up to 45 degrees. Meanwhile, the inventors prepared a spindle device of the same static pressure structure as an embodiment of this invention, equipped with two identical motors whose cores and magnets are disposed in the same position to each other (Same phase arrangement and no skews) and cooling water pipeline to cool the motor casings is branched and connected so that the cooling water flows parallel to the motor casing. A current of the same phase was applied to the motors to drive the spindle device at 35,000 min$^{-1}$. In this experiment, the temperature of the cooling water was 34 degrees. This temperature is lower by 11 degrees centigrade than that of the comparative example and a higher cooling effect was observed.

Further, the rotational precision of the spindle device having the twin motors of the above embodiment was measured. The result of measurement was 50 nm PP (peak-to-peak) in the radial direction and approx. 10 nm PP in the axial direction. Under this condition, the inventors shifted two 4-pole permanent magnets on the spindle from each other by half of the pole-to-pole angle (½ pitch) (½ pitch shift, no skews), applied currents whose phases are shifted from each other by 90 degrees to each of the coils, and matched their rotational magnetic fields to run the motors apparently as a 8-pole motor. The measured rotational precisions were 30 nm PP in the radial direction and 10 nm PP in the axial direction and thus this embodiment is found to provide more accurate rotation.

Figure 6:
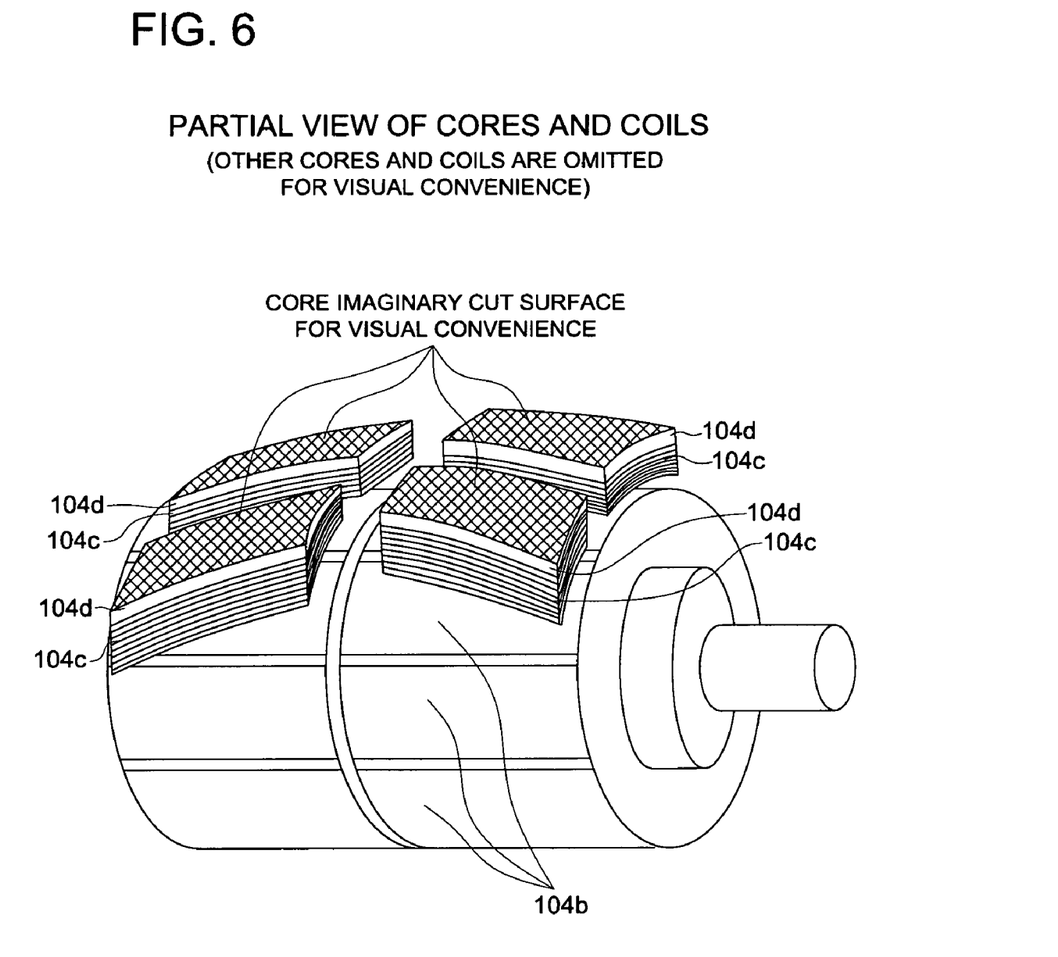
FIG. 6 is a partial view of cores and coils of a preferred embodiment of this invention.

Then, skews of the same angle was provided to the magnets on the main shaft (skew angle of +10 degrees and +10 degrees) (½ pitch shift, skews of the same direction) and ran the main shaft at 35,000 min$^{-1}$ in the same manner. The measured rotational precisions were 25 nm PP in the radial direction and 30 nm PP in the axial direction. Meanwhile, the inventors provided skews of different angles to the magnets on the main shaft (skew angle of +10 degrees and −10 degrees), shifted pole phases by ½ pitch as described above (½ pitch shift, skews of the opposite directions), and ran the main shaft at 35,000 min$^{-1}$ in the same manner. The measured rotational precisions were 21 nm PP in the radial direction and 8 nm PP in the axial direction. From the above comparison result, the rotational precision in the radial direction can be increased twice or more without reducing precision in the axial direction. The temperature rise due to heat generation in this embodiment was half of that of the spindle device of a single motor (refer to FIG. 6).

This invention has been described above with reference to preferred embodiments, however, it is to be understood that the invention is not intended to be limited to the specific embodiments. Appropriate Variations or improvements may be made. For example, in the above embodiment, two lines of magnets 104b and 104b are skewed oppositely to each other with their phases shifted, but it is possible to shift phases of two coils 104c and 104c and to reverse the skew angles from each other. Further it is possible to skew cores and magnets (where the skew angles of the opposing cores and magnets are different).

Further, the spindle device can be driven by any kind of motor. The motor can be an AC servo motor with cores, an AC servo motor without cores, and an induction motor using conductors instead of the above-described magnets. Particularly the effect of this invention is more apparent for the induction motors since they have more slipping loss generating heat than the AC servo motors.

What is claimed is:

1. A built-in motor type spindle device comprising:
a housing including a cooling jacket to which a cooling medium is supplied from an outside;
a main shaft;
a static pressure bearing for supporting the main shaft rotatably with respect to the housing by a pressure transmission medium which is supplied to a clearance between the static pressure bearing and the main shaft; and
an AC servomotor comprising:
　two lines of magnets mounted on the main shaft so that opposite polarity poles are arranged alternately in a circumferential direction; and
　two pairs of coils mounted in the housing so as to face the two lines of magnets respectively, the two pairs of coils being wound around two pairs of cores respectively,
wherein phase arrangements of at least one of the opposite polarity poles of the two lines of magnets and the pairs of cores are displaced from each other in a circumferential direction, and,
wherein at least one of the two lines of magnets and the two pairs of cores has skews whose directions are opposite to each other wherein when both the two lines of magnets and the two pairs of cores have the skews, angles of the skews are different from each other.

* * * * *